United States Patent Office 3,445,555
Patented May 20, 1969

3,445,555
PROCESS FOR AGGLOMERATING FINE
METAL POWDERS
De Witt Henry West and Alexander Bowen Simpson,
Swansea, Wales, assignors to The International Nickel
Company, Inc., New York, N.Y., a company of
Delaware
No Drawing. Filed Mar. 13, 1967, Ser. No. 622,426
Claims priority, application Great Britain, Mar. 17, 1966,
11,793/66
Int. Cl. B22f 3/02
U.S. Cl. 264—111                              10 Claims

ABSTRACT OF THE DISCLOSURE

Finely divided soft metal powders, e.g. nickel powders, are agglomerated by ball milling the powders at temperatures between about 40° C. and 200° C. and in a nonoxidizing atmosphere.

---

The present invention relates to milling of finely divided, soft metal powders to produce coarser particles and more particularly to the chemical and mechanical treatment to agglomerate soft metal powders of very fine particle size.

Some metal powders are produced in very small particle size. These include copper powder and powders produced by the decomposition of metal carbonyls, e.g., carbonyl nickel, iron and cobalt powders. Such powders generally have an average particle size of 8 microns or less, for example from 2 to 8 microns according to the conditions of decomposition of the carbonyls or of the production of the copper.

The small particle size and very poor flow properties of such fine powders make them unsuitable for various purposes, including incorporation into tubular welding electrodes, and severely limit the thickness of strip that can be produced from them by roll-compacting. Coarser powders, e.g., with an average particle size of 350 mesh British Standard Screen (BSS) and above, have much better flow properties, are compatible with the other powder ingredients of tubular welding electrodes and can be roll-compacted to thicker strip, e.g., 0.1 inch thick and above. It is accordingly desirable to increase the average particle size of fine powders, and there is a demand for powder of average particle size in the range of minus 60 to plus 350 mesh BSS.

It is already known to increase the average particle size of such powders, and in particular in U.S. Patent No. 2,995,780 a process is described in which such powders are increased in average particle size by milling in a high-speed ball mill such as a planetary mill in which the charge and grinding balls are subjected for a period of hours to a high centrifugal field in which the force is at least twice the force exerted by gravity. According to United Kingdom Patent No. 912,351, the particle size is increased more quickly by performing the milling in an oxygen-free atmosphere, which may be reducing, but is preferably inert, the powder advantageously being reduced chemically to remove any oxide skin already present before being milled. In the processes described in both of these patents the milling takes place at room temperature.

High-speed planetary ball mills are expensive and rather complex pieces of equipment, and are not suitable for large-scale production. In addition they can in fact be used only for milling batches of powder and cannot be used in continuous processes.

It has now been discovered that finely divided soft metal powders such as nickel, cobalt, iron and copper can be milled in low energy ball mills under controlled conditions of temperature and atmosphere to agglomerate the finely divided metal powders.

It is an object of the present invention to provide a process for agglomerating soft metal powders in low speed ball mills.

Another object of the invention is to provide a continuous process for agglomerating finely divided soft metal powders.

Other objects and advantages will become apparent from the following description.

Broadly stated, the present invention contemplates agglomerating metal powders in a low-speed ball mill by milling finely divided, soft metal powders in an atmosphere nonoxidizing to the metal powder and at a temperature of at least about 40° C. to increase the average particle size of the metal powder.

Finely divided, soft metal powders as used herein refers to powders having an average particle size of less than about 350 mesh BSS and includes soft metals such as nickel, cobalt, iron and copper. Soft metal powders produced by vapormetallurgical techniques, which often have an average particle size of less than about 15 microns are advantageously treated in accordance with the process of the present invention. Thus, the process of the present invention is particularly applicable to carbonyl nickel powder of both type "A," which consists of discrete particles, and type "B," which consists of interlocking chains of intergrown particles and generally has a low bulk density.

Advantageously, the atmosphere within the ball mill is reducing to the oxide of the metal being agglomerated. The reducing atmosphere most suitably consists of or contains hydrogen although the reducing atmosphere can contain other reducing constituents such as carbon monoxide but this can only be used with copper or cobalt powders. The reducing atmosphere can contain inert diluents such as nitrogen but these tend to slow the rate of agglomeration of the metal powders.

The rate of agglomeration increases with temperature. Thus although some agglomeration of carbonyl nickel powder occurs on milling in a ball mill under hydrogen even at room temperature, the process is too slow for commercial use. On the other hand if the temperature is too high, e.g., over 200° C., agglomeration of the powder is too severe and the process becomes inoperable. A suitable range of operating temperatures is from 50° C. to 150° C., or even up to 170° C. Within this temperature range the milling time needed depends both on the temperature and on the yield of coarse powder desired, the time taken to bring about a given increase in average particle size decreasing as the temperature increases. It is therefore necessary to correlate the residence time of the powder in the mill with the temperature. In continuous milling the residence time of the powder in the mill is generally shorter than with batch operation, and temperatures in the upper part of the range set forth above, for example about 150° C., are preferred.

The process of the present invention is advantageously conducted in low speed ball mills in contradistinction to the prior art which required high speed planetary ball mills. The term "low speed ball mills" as used herein refers to ball mills operated at conventional speeds of about 30% to 60% of the critical speed such that a high centrifugal field is not generated within the mill.

By way of example, a ball mill 11.4 inches long and 7.8 inches diameter was charged with 29 pounds of 0.75 inch diameter steel balls and 7.25 pounds of carbonyl nickel powder. The mill was rotated at 45 r.p.m. (that is 45% of the critical speed) while the mill and its contents were heated by gas burners beneath the mill to a predetermined temperature during one hour and then maintained at this temperature for a predetermined time, at the end of which the mill was purged with inert gas and cooled to room temperature. During the heating hydrogen was passed through the mill at a rate of 170 litres per hour. Results of a series of such tests using different times and temperatures are set out in the table below, which also includes results showing the effect on the particle size distribution and bulk density of milling at room temperature under hydrogen and at 100° C. in an inert atmosphere of nitrogen.

It is an advantage of the use of conventional ball mills that, instead of milling the powder batchwise, a continuous mill may be employed, through which the powder may if desired be recirculated. Apparatus embodying a continuous mill should include means for separating and removing the coarse product fraction from the powder leaving the mill and for recirculating the remaining fines for remilling together with fresh feed powder. By suitable choice of operating conditions substantially the whole of

TABLE

| Test No. | Powder type | Atmosphere | Temperature (° C.) | Milling Period (hr.) | | | Particle size distribution percent | | | Bulk density, g./cc. |
|---|---|---|---|---|---|---|---|---|---|---|
| | | | | Warming up | At temp. | Total | +60 | −60+350 | −350 | |
| 1 | A | H₂ | 15 | 0 | 13 | 13 | 4.6 | 27.2 | 68.2 | 3.89 |
| 2 | A | H₂ | 70 | 1 | 12 | 13 | 50.8 | 42.5 | 6.7 | 3.37 |
| 3 | A | H₂ | 70 | 1 | 18 | 19 | 45.1 | 52.5 | 2.4 | 4.16 |
| 4 | A | H₂ | 100 | 1 | 12 | 13 | 45.5 | 52.4 | 2.1 | 3.91 |
| 5 | A | H₂ | 150 | 1 | 1 | 13 | 23.6 | 58.2 | 18.2 | 3.7 |
| 6 | A | H₂ | 150 | 1 | 12 | 13 | | | | |
| 7 | A | N₂ | 100 | 1 | 12 | 13 | 11.9 | 50.5 | 37.6 | 3.73 |
| 8 | B | H₂ | 100 | 1 | 12 | 13 | 50.0 | 48.0 | 2.0 | 3.69 |

In each of tests Nos. 1 to 7 inclusive the carbonyl nickel powder charged was type A powder having a bulk density of 2.38 g./cc. and average particle size 5.22 microns. All of it passed through a 350 mesh sieve. It will be seen from test 1, carried out at room temperature that after 13 hours 68.2% of the powder still passed through a 350 mesh sieve, and only 27.2% had reached the desired particle size. When, however, the temperature was increased to 70° C., 42.5% of the powder had reached the desired particle size after a total period of 13 hours and 50.8% had become coarser still. Such coarser particles may of course be desired as a product, or they may be separated and milled in air to decrease their particle size (the normal effect of ball milling under these conditions) to produce further powder having particle size less than 60 mesh. Any powder thus comminuted that is smaller than the desired particle size can then be remilled under a reducing atmosphere such as hydrogen either alone or with a fresh charge in order to bring its particle size into the desired range.

Returning to the table, test 3 shows that by increasing the milling time the proportion of fine particles can be still further decreased and the fraction of the desired size further increased. Substantially the same result can be obtained by increasing the temperature and decreasing the time, as is shown by test 4.

In test 5 the temperature was raised to 150° C. This temperature was maintained for only 1 hour, but milling was continued for a further 11 hours while the mill was cooling and cold. This had the effect of increasing still further the desired fraction, but it is clear that the comparatively short time at high temperature was not enough, as the proportion of fine powder was as much as 18.2%. On the other hand to increase the residence time at 150° C. to 12 hours is much too much, as is made clear by test 6, since at the end of this time all the powder in the mill had agglomerated into cake and there was no free powder left.

Comparison of the results of tests 4 and 7 shows that the rate of agglomeration under otherwise similar conditions is considerably greater when milling is carried out in a reducing than in an inert atmosphere.

In test 8 the charge consisted of type B carbonyl nickel powder having a bulk density of 0.87 g./cc. and an average particle size of 3.19 microns. All of it passed through a 350 mesh sieve. The excellent result of milling at 100° C. for 12 hours in hydrogen is clearly shown.

The tests described relate to batch processes. If the process is carried on in batch fashion a fine fraction, e.g., of particles smaller than 350 mesh BSS (44 microns), can be separated from the milled powder and remilled either alone or together with a fresh charge of powder.

the powder thus may be brought to the desired particle size at a high rate of output.

Instead of using a simple rotary ball mill the milling may be carried out in a vibratory mill consisting of a tube containing balls, commonly of steel, which are made to vibrate by imparting a vibratory motion to the tube. With such a mill the sealing of the gas inlet and outlet is simplified, since the mill tube does not revolve. The feeding and discharge of powder are also simplified.

Coarse nickel powder made according to the invention is in the form of irregularly shaped granules. Thus, both types A and B carbonyl nickel powder can be treated in accordance with the process of the present invention to agglomerate the powders so that the average particle size is greater than 350 mesh BSS. The agglomerated nickel powder has improved flow characteristics and can advantageously be employed in tubular welding electrodes. The agglomerated nickel powder can also be roll compacted into thick strips.

We claim:

1. A process for agglomerating finely divided soft metal powders in a ball mill which comprises milling finely divided soft metal powders in an atmosphere non-oridizing to the metal powder and at a temperature of at least about 40° C. to increase the average particle size of the metal powders.

2. A process as described in claim 1 wherein the temperature is maintained below about 200° C.

3. A process as described in claim 2 wherein the temperature is between about 50° C. to 150° C.

4. A process as described in claim 2 wherein the finely divided soft metal powder is type A carbonyl nickel powder.

5. A process as described in claim 2 wherein the finely divided soft metal powder is type B carbonyl nickel powder.

6. A process for agglomerating finely divided soft metal powders in a low speed ball mill which comprises rotating the ball mill at a speed such that a high centrifugal field is not generated within the mill, feeding a finely divided soft metal powder to the ball mill, passing a reducing atmosphere through the ball mill and heating the ball mill to a temperature of at least about 40° C. to increase the average particle size of the metal powder.

7. A process as described in claim 6 wherein the ball mill is rotated at a speed of about 30% to 60% of the critical speed.

8. A process as described in claim 7 wherein the temperature of the ball mill is between about 50° C. to 150° C.

9. A process as described in claim 8 wherein the finely divided soft metal powder is type A carbonyl nickel powder.

10. A process as described in claim 8 wherein the finely divided soft metal powder is type B carbonyl nickel powder.

References Cited

UNITED STATES PATENTS 2,995,780  8/1961  West et al. _____ 264—111

FOREIGN PATENTS 881,399  11/1961  England.
912,351  12/1962  England.

ROBERT F. WHITE, *Primary Examiner.*

J. R. HALL, *Assistant Examiner.*

U.S. Cl. X.R.

264—117